(No Model.)

W. O. BYRD.
COFFEE OR TEA POT.

No. 528,201. Patented Oct. 30, 1894.

WITNESSES

A. B. Digges
L. D. Hinrichs

INVENTOR:
William O'Byrd,
by E. E. Masson, Attorney.

UNITED STATES PATENT OFFICE.

WILLIAM O. BYRD, OF BALTIMORE, MARYLAND.

COFFEE OR TEA POT.

SPECIFICATION forming part of Letters Patent No. 528,201, dated October 30, 1894.

Application filed March 21, 1894. Serial No. 504,624. (No model.)

*To all whom it may concern:*

Be it known that I, WILLIAM O. BYRD, a citizen of the United States, residing at Baltimore, in the State of Maryland, have invented certain new and useful Improvements in Coffee or Tea Pots, of which the following is a specification, reference being had therein to the accompanying drawings.

My invention relates to strainers for coffee and tea pots and the objects of my improvement are to combine with the walls of an ordinary coffee pot having a series of relatively large perforations therein in the rear of the spout, a simple, inexpensive but finely perforated strainer plate adapted to be received and normally retained within said spout by friction of its edges against the inner surface of the spout where said spout is soldered to the walls of the pot, and by friction of its rear surface against the bead formed around the top edge of the pot; the strainer being outwardly curved so as to obtain a sediment chamber between the perforated walls of the pot and said strainer; and although the strainer is removable, it is so situated within the spout that it can be taken off (to be cleaned) or be replaced without requiring the introduction of the hand of the user within the pot. I attain these objects by the construction illustrated in the accompanying drawings, in which—

Figure 1:
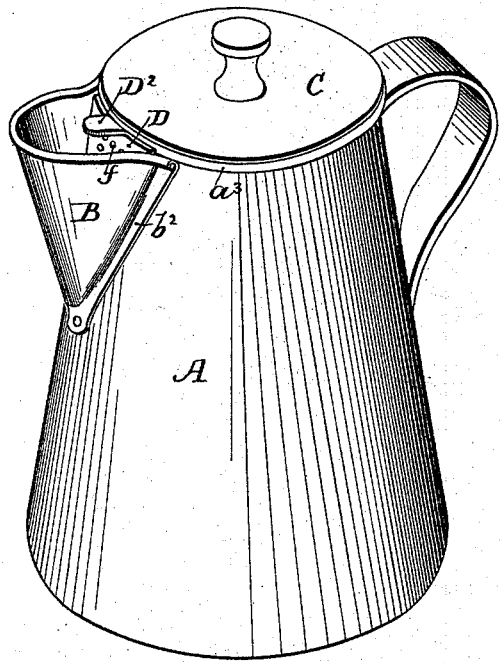
Figure 2:
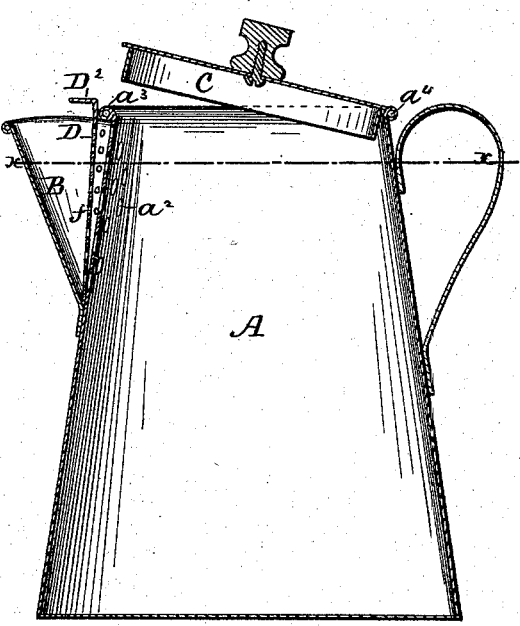
Figure 3:
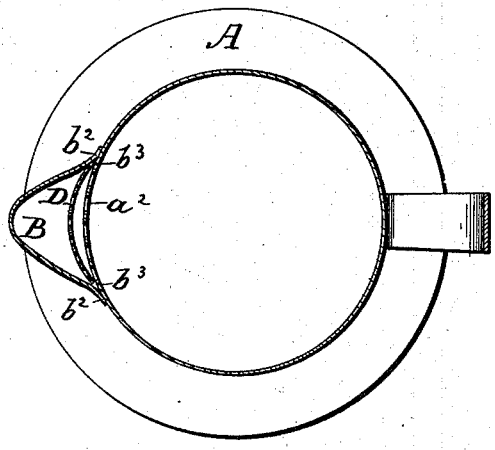
Figure 4:
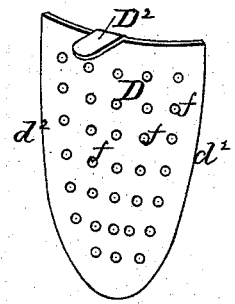

Figure 1 is a perspective view of a coffee pot provided within its spout with a removable strainer constructed and located therein in accordance with my invention. Fig. 2 is a longitudinal vertical section of the same. Fig. 3 is a horizontal section of the same on line $xx$ of Fig. 2. Fig. 4 is a perspective view of the strainer.

In said drawings A represents the walls of a coffee pot provided, as usual, with a spout B on the front side thereof. Said spout is soldered to the walls A along its side edges $b^2$, and in the rear of the spout, the walls of the pot are provided with a series of relatively large perforations $a^2$ which generally allow a portion of the coffee grounds to pass therethrough when a cup of coffee is poured from the spout. The object of my invention is to prevent by simple and inexpensive means, this objectionable feature.

The upper edges of the walls A are outwardly turned over to constitute a strengthening bead $a^3$ that incloses a wire $a^4$ that constitutes also the journal for the hinge of the cover C.

The removable strainer D forming the main part of my invention consists of a small plate of tinned sheet metal cut of such form that the edges $d^2$ will fit closely within the grooves $b^3$ obtained along the inner side of the soldered edges $b^2$ of the spout, and between them and the outer face of the walls A. The strainer is provided with perforations $f$ much finer than the perforations $a^2$ in the walls of the pot, and fine enough to prevent the passage of any of the coffee grounds. The strainer has outwardly projecting from its upper edge a handle $D^2$ by which it can be readily forced into its seat within the spout, or be removed therefrom to clean it, without opening the cover of the pot or introducing a person's hand therein. The strainer D has given thereto a curvature corresponding with that of the bead $a^3$ against which its upper portion fits closely to obtain a chamber F closed at the top but provided with coffee straining perforations in its front and rear, said chamber permitting the equalization and even distribution of the liquid flowing from the larger to the smaller perforations.

Having now fully described my invention, I claim—

In combination with the walls of a coffee pot having a bead $a^3$ around its top edge, perforations $a^2$ in its side and a spout B in front of said perforations, the strainer D having perforations $f$ finer than the perforations $a^2$, and inserted within the spout B with its curved upper edge resting against the bead $a^3$ of the pot, whereby a liquid distributing chamber F is obtained between the perforated front wall of the pot and the strainer within the spout substantially as described.

In testimony whereof I affix my signature in presence of two witnesses.

WILLIAM O. BYRD.

Witnesses:
HARRY A. BYRD,
W. J. MORGAN.